United States Patent [19]

Kramer et al.

[11] Patent Number: 4,787,622
[45] Date of Patent: Nov. 29, 1988

[54] CONVEYING DEVICE FOR METAL SHEETS, PARTICULARLY ON A CAN WELDING MACHINE

[75] Inventors: Felix Kramer; Günther Westerhold, both of Friedlisberg, Switzerland

[73] Assignee: Elpatronic AG, Switzerland

[21] Appl. No.: 66,870

[22] Filed: Jun. 25, 1987

[30] Foreign Application Priority Data

Jul. 7, 1986 [CH] Switzerland ............... 02738/86

[51] Int. Cl.⁴ ............................................. B65H 5/16
[52] U.S. Cl. .................................. 271/225; 271/184; 271/193; 271/269
[58] Field of Search ............... 271/193, 225, 184, 271, 271/269; 198/679, 690

[56] References Cited

U.S. PATENT DOCUMENTS

| 978,551 | 12/1910 | Bray | 271/269 X |
| 2,672,931 | 3/1954 | Maher | 271/193 N X |
| 3,409,149 | 11/1968 | Graux | 271/193 X |
| 4,180,257 | 12/1979 | Buccicone | 271/193 |
| 4,189,270 | 2/1980 | Ehrlich | 271/184 X |

Primary Examiner—Richard A. Schacher
Attorney, Agent, or Firm—McCormick, Paulding & Huber

[57] ABSTRACT

Disposed between magnetic rollers (32) which can be driven in rotation for conveying metal sheets (10) suspended from them and leave gaps (40) free between them, are pushers (44). The pushers (44) can be moved out of a retracted upper position in which they leave the sheets (10) freely suspended on the magnetic rollers (32) into a lower position in which they hold the sheets (10) at a distance below the magnetic rollers (32). The movement of the sheets (10) in the conveying direction (18) of the magnetic rollers (32) is limited by a stop (72). In the lower position, in which they have pushed a sheet (10) off the magnetic rollers (32), the pushers (44) are movable, with the sheet (10), transversely to the conveying direction (18) of the magnetic rollers (32). Disposed laterally beside the magnetic rollers (32) is a withdrawal device (76) which conveys onwards the sheets (10) that have been moved away from the magnetic rollers (32) by the pushers (44). The undersides of the sheets (10) are not touched on the way to the withdrawal device (76) and are consequently protected from damage.

6 Claims, 5 Drawing Sheets

CONVEYING DEVICE FOR METAL SHEETS, PARTICULARLY ON A CAN WELDING MACHINE

The invention relates to a conveying device for metal sheets, particularly on a can welding machine, having magnetic rollers which can be driven in rotation for conveying metal sheets adhering to them and which leave gaps between themselves, and a plurality of pushers which, engaging in a comb-like manner through the gaps between the magnetic rollers, can be moved out of a retracted position in which they leave the sheets adhering freely to the magnetic rollers, into a position in which they hold the sheets at a distance from the magnetic rollers.

In a known conveying device of this type (pamphlet "Magnetrollen Seila Eriez", Belley, Switzerland, 1984), the pushers are equipped with their own magnetic clamps and their purpose is to lift sheets from a stack and to move them upwards until they adhere to the magnetic rollers in order to be conveyed onwards by these. In the course of this, only the top of the sheet comes into contact with the magnetic rollers and the pushers so that the bottom of the sheet is protected.

Such gentle handling is necessary, inter alia in the case of sheets which are being made into can bodies and have been lacquered on the side which later forms the inside of the can bodies. Such sheets, if they are intended for tear-open cans, can be provided, after lacquering, with scorings which define a tear-off strip; a pull tongue is then secured, for example welded, to the tear-off strip. The sheets are then fed to a rounding station in which they are rolled into cylindrical bodies to be finally butt or lap welded at their adjacent longitudinal edges. On the way into the rounding station, the sheets must be conveyed particularly carefully, individually and as continuously as possible in order that their lacquering should not be damaged; any intermediate stacking involves a risk to the lacquering because the pull tongue of each sheet forms a raised portion which can scratch the lacquering of a sheet lying above or below it.

It is an object of the invention to develop a conveying device of the type described at the beginning in such a manner that the sheets can be supplied gently and without intermediate stacking to a further processing station, in particular to a sheet rounding station.

According to the invention, the problem is solved in that the movement of the sheets in the conveying direction of the magnetic rollers is limited by a stop, in a position in which they have pushed a sheet down from the magnetic rollers, the pushers are movable, with the sheet, transversely to the conveying direction of the magnetic rollers and disposed laterally beside the magnetic rollers is a withdrawal device which effects the further conveying of sheets which have been moved away from the magnetic rollers by the pushers.

The conveying device according to the invention is particularly well suited for sheets which comprise at least one raised portion, particularly a pull tongue, close to one lateral edge. For such sheets, the device according to the invention is preferably further developed in that a lateral guide is disposed at each side of the magnetic rollers and the magnetic rollers leave a free space between themselves and one of the lateral guides for the raised portions of the sheets.

At least one of the pushers preferably comprises a pusher dog for the transverse conveying of the sheets.

It is a further advantage if the pushers are mounted on parallelogram links. In this case the swinging movement of the parallelogram links is sufficient to push a sheet away from the magnetic rollers and to move it transversely to the conveying direction of the magnetic rollers.

The pushers preferably consist of non-magnetic material, for example brass or plastics material. Thus the effect is achieved that, after the pushers have pushed the sheets away from the magnetic rollers, they only remain clinging to the pushers as a result of the magnetic field of the magnetic rollers and easily become detached from the pushers as soon as these project between the magnetic rollers for a certain distance.

Finally, it is an advantage if the said stop is movable jointly with the pushers.

One example of embodiment of the invention is explained below, with further details, with reference to diagrammatic drawings.

Figure 1:
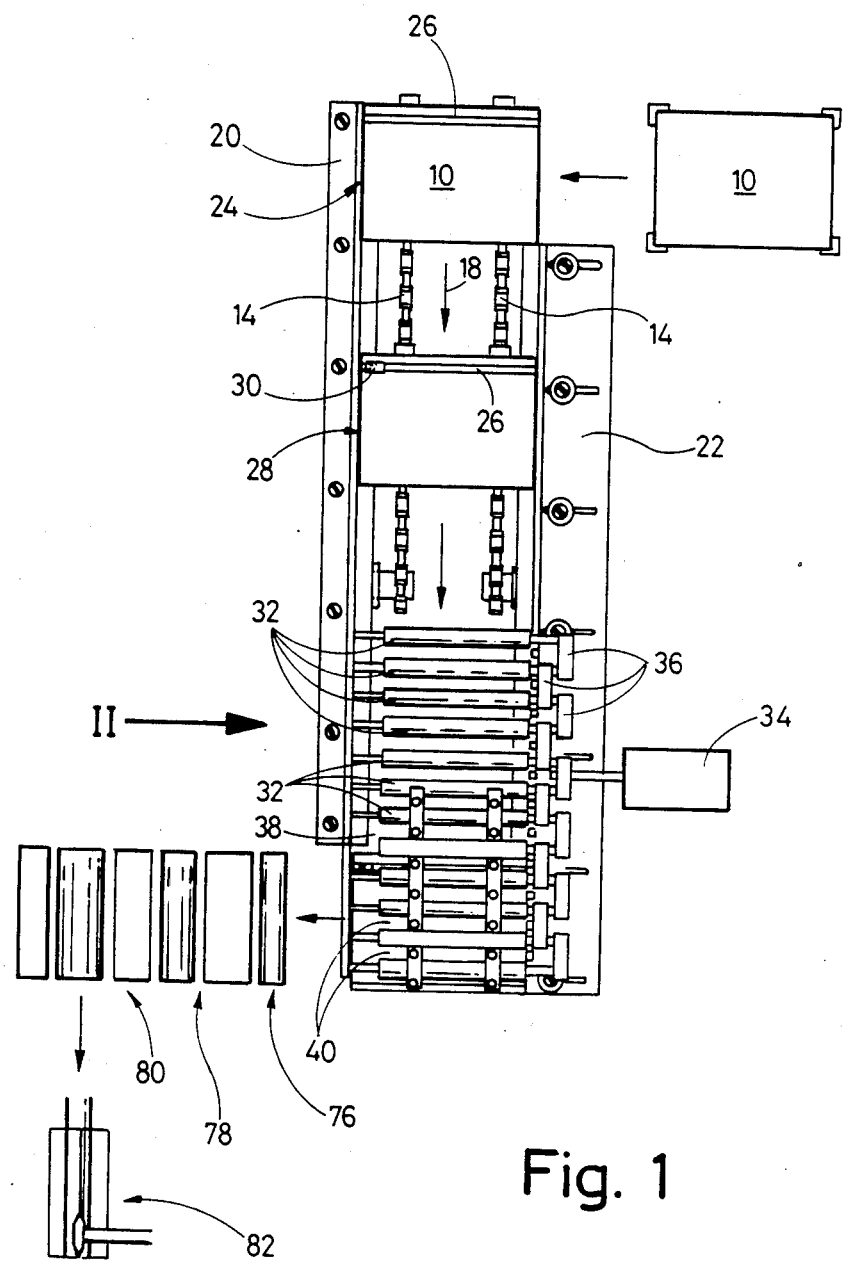
FIG. 1 shows the plan view of a conveying device according to the invention.

Sheets 10 from a stack are laid individually, one after the other, on a pair of conveyor chains 14 which are equipped with pusher dogs 16 arranged in pairs to move the sheets 10 in a conveying direction 18 and are disposed between two lateral guides 20 and 22. The spacing apart of the guides 20 and 22 is adjustable according to the width of sheet in such a manner that the sheets 10 are guided between the guides almost without clearance. In FIG. 1, the guides 20 and 22 are represented as guide rails; groups of guide rollers may also be provided, however, each of which is rotable about a vertical axis.

The sheets 10 travel through a scoring station 24 in which they receive two parallel scorings defining a tear-off strip 26; the sheets 10 then travel through a welding station 28 in which a raised portion 30 in the form of a pull tongue is welded onto the tear-off strip 26 and is intended to facilitate the tearing open of a can produced from the sheet 10 in question.

Details of the formation of the stack, of a device for removing the sheets 10 from the stack, of the scoring station 24 and of the welding station 18 can be seen from the earlier U.S. patent application Ser. No. 840,440 filed Mar. 17, 1987, entitled "WELDING MACHINE FOR WELDING TONGUES ONTO SHEET-METAL PARTS", a patent which issued on Mar. 1, 1988 under U.S. Pat. No. 4,728,766 or EP No. 86103007.0 and need no explanation in the present connection.

It is important that the sheets 10, each provided with a raised portion 30, should be conveyed onwards for their further processing, to form can bodies in the example illustrated, without being pushed one over the other or stacked one on top of the other in such a manner that the raised portion 30 of a lower sheet would touch the under side of a sheet lying above it.

In order to avoid such contact, the sheets 10 are conveyed onwards individually one behind the other, adhering to magnetic rollers 32, suspended in the example illustrated. The magnetic rollers 32, following on the conveyor chains 14, are arranged one behind the other in their conveying direction 18, and can be continuously driven by a motor 34, through driving belts 36, at the same peripheral speed and in such a direction of rotation that the direction of movement of the underside of the magnetic rollers 32 coincides with the conveying direction 18. In order to prevent the magnetic rollers 32 from touching the raised portions 30, a free space 38 is provided between them and the guide 20, in the vicinity of which the raised portions 30 have been welded onto the sheets 10, the width of which space is greater than the length of the raised portions 30 measured in the longitudinal direction of the tear-off strips 26.

A gap 40 is provided between each two adjacent magnetic rollers 32. The gaps between the first to the seventh magnetic rollers 32 are partially filled in by stationary intermediate members 42 so that the sheets 10 are prevented from becoming caught between these magnetic rollers. The gaps 40 between the seventh and thirteenth magnetic rollers are partially filled in by appropriately shaped pushers 44 of brass which are suspended from a common plate 46 disposed above the magnetic rollers 32 and are movable jointly with this plate.

The mobility of the pushers 44 results from the fact that the plate 46 is suspended on parallelogram links 48 which are pivotally mounted on a frame 50. In order to pivot the parallelogram links 48, one of them is connected, through a first rod 52 which is adjustable in length and a first bell-crank lever 54 which is mounted on a first spindle 56 on the frame 50, and through a second rod 58 which is adjustable in length, to a second bell-crank lever 60. The second bell-crank lever 60 is likewise mounted on the frame 50 for pivoting about a second spindle 62 and is connected, by means of a third rod 64 which is adjustable in length, to a third bell-crank lever 66 which can be pivoted stepwise by a motor 70 by means of a cam plate 68.

Figure 2:
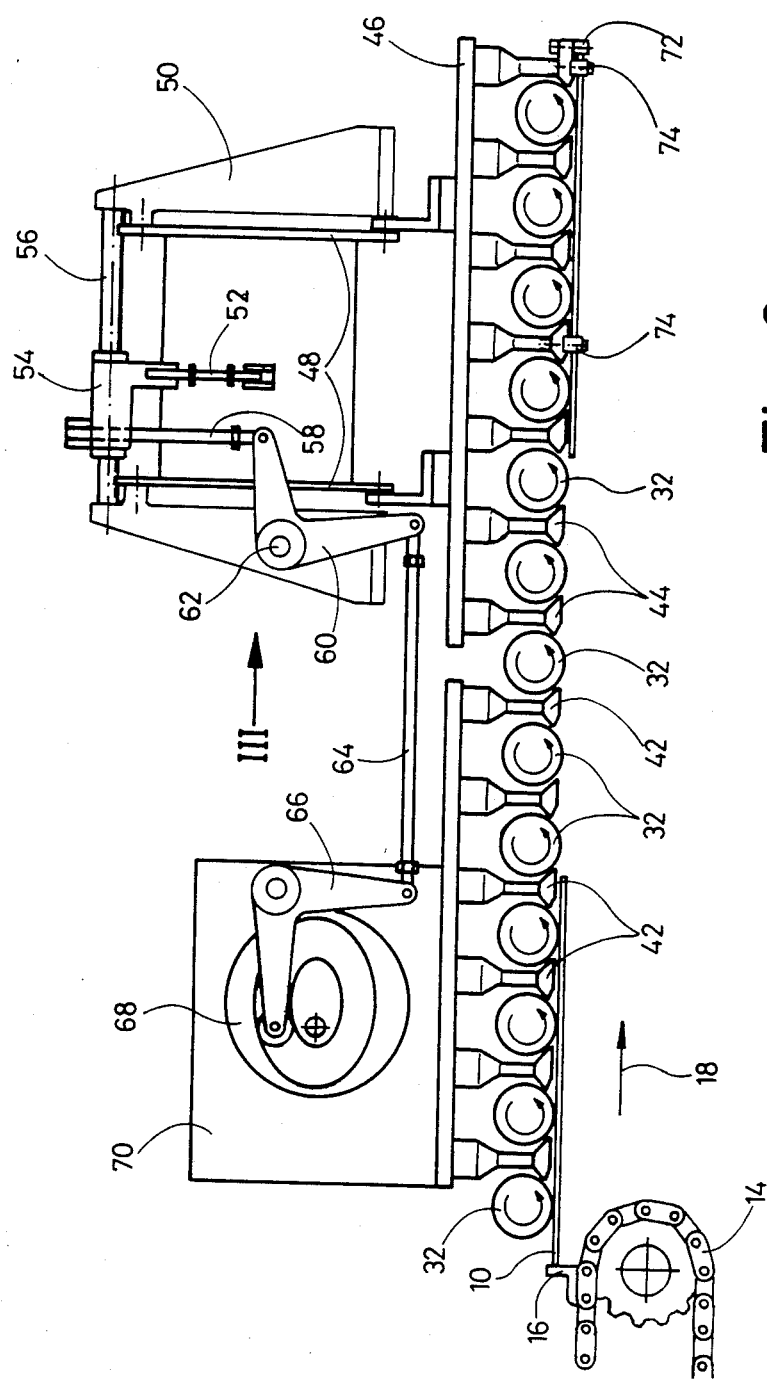
FIG. 2 shows a side view of part of the conveying device in the direction of the arrow II in FIG. 1.
Figure 3:
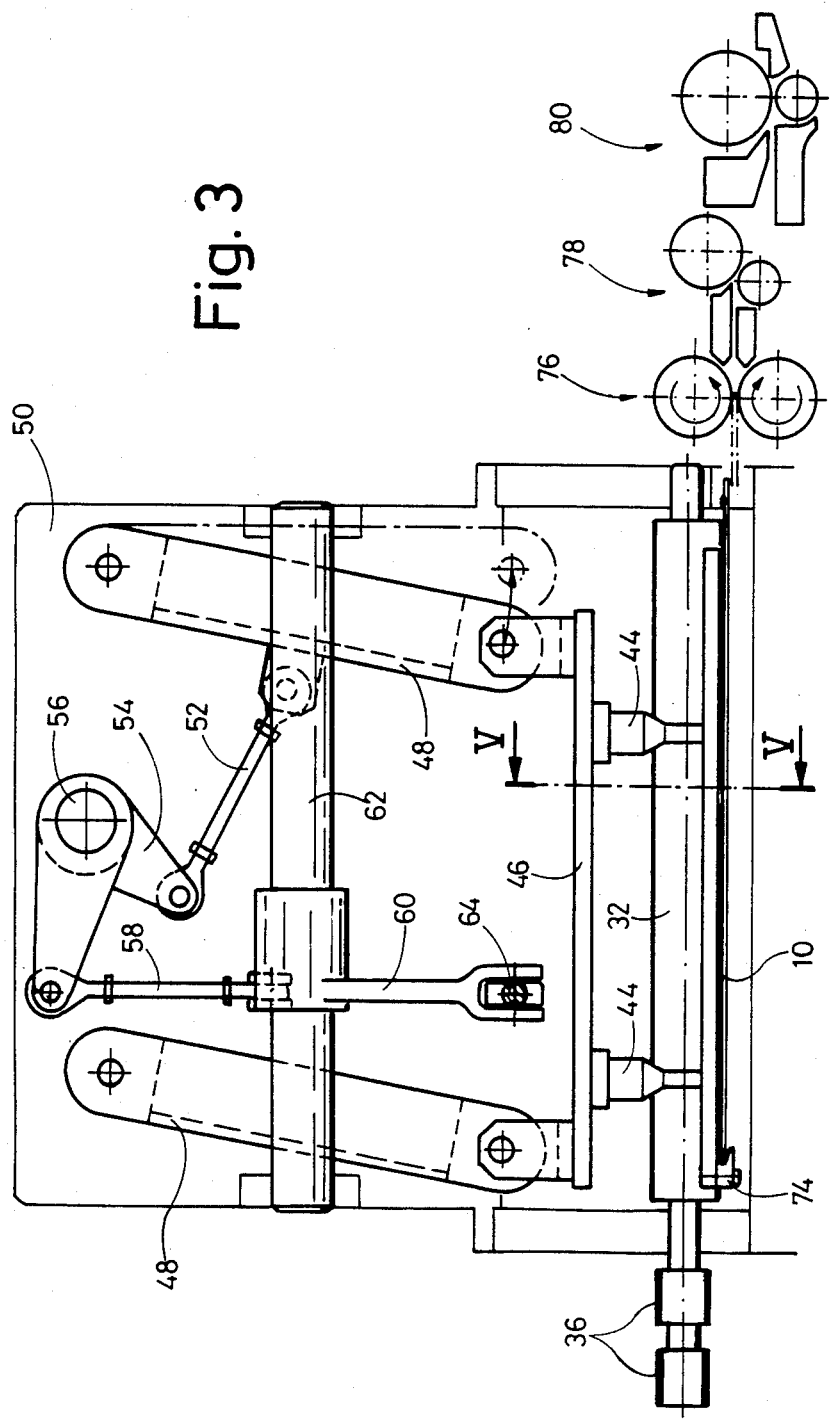
FIG. 3 shows the partial view in the direction of the arrow III in FIG. 2.
Figure 4:
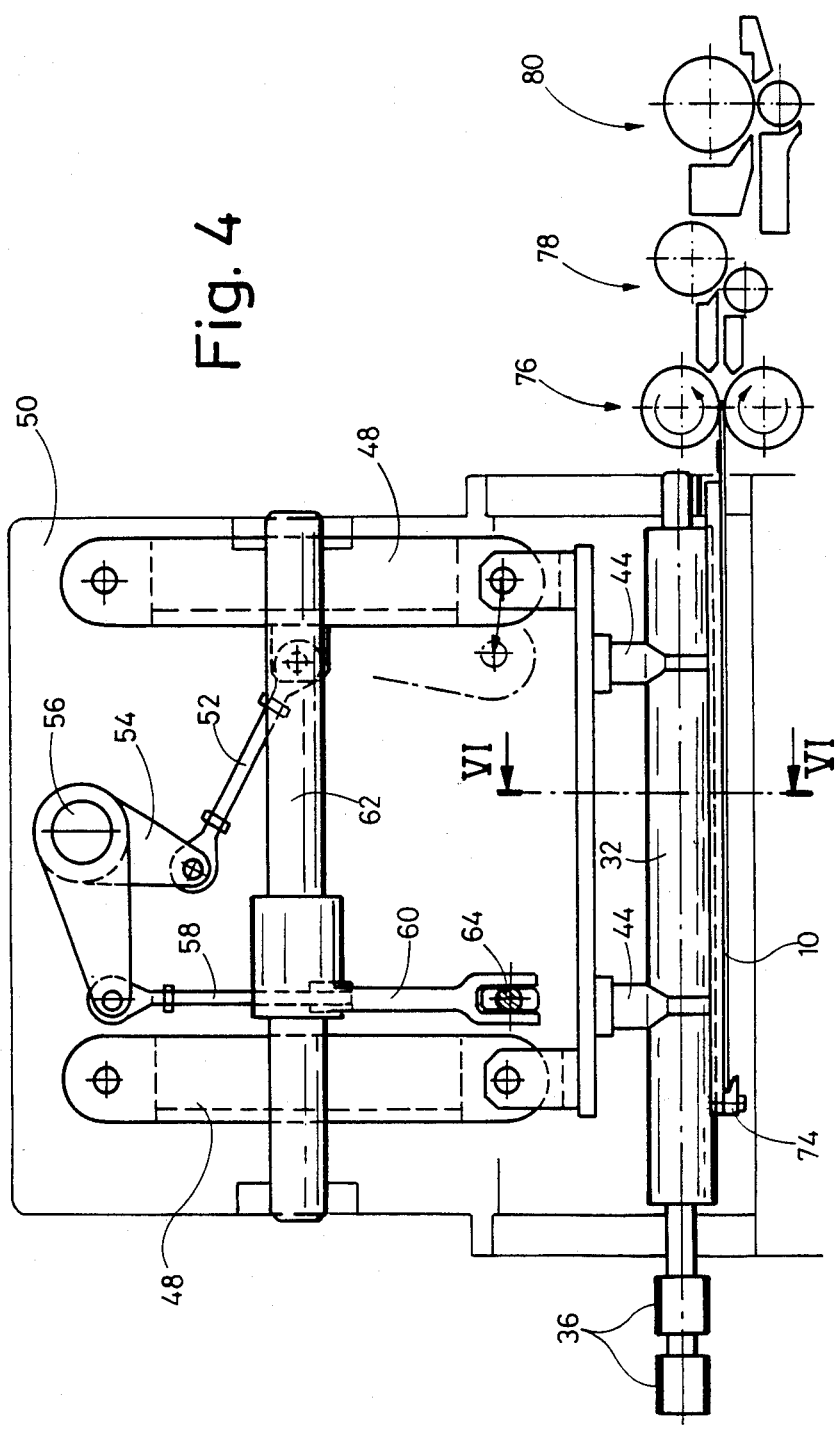
FIG. 4 shows a corresponding partial view in another working position of the device.
Figure 5:
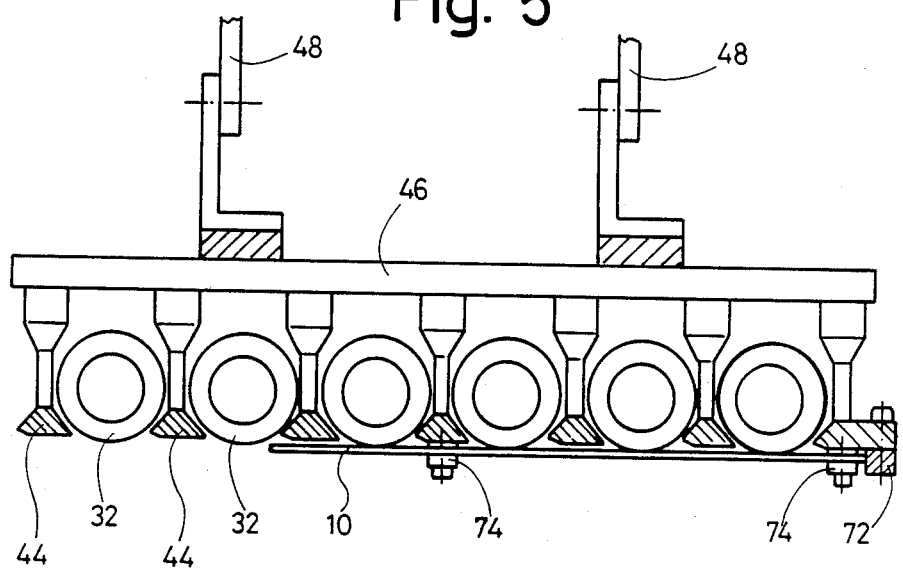
FIG. 5 shows the partial section V—V in FIG. 3
Figure 6:
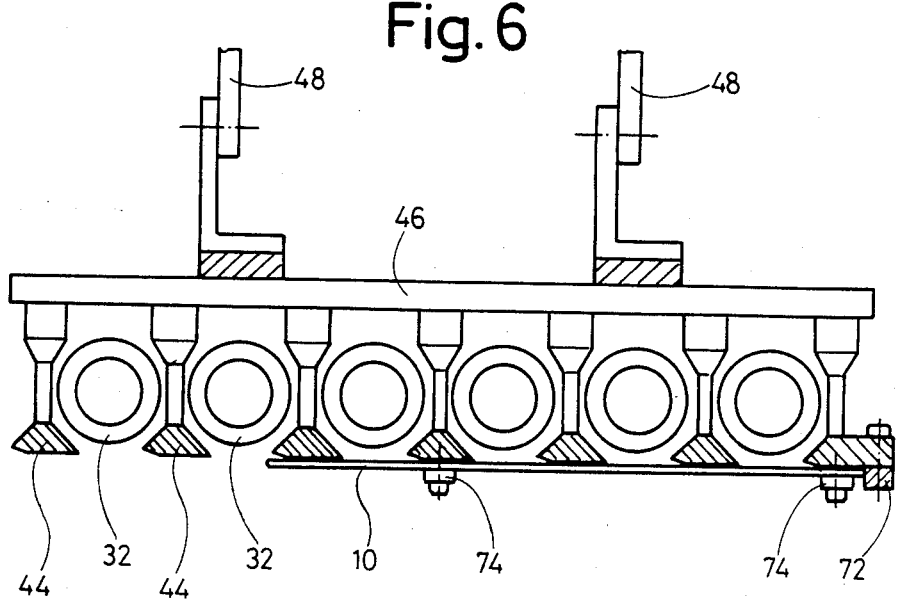
FIG. 6 shows the partial section VI—VI IN FIG. 4.

On each complete revolution of the motor 70, the pushers 44 execute one cycle of movement. This begins in an upper end position illustrated in FIGS. 2, 3 and 5 in which the pushers 44 are arranged between the magnetic rollers 32 in such a manner that they do not touch the sheets 10 brought up suspended on the magnetic rollers. A movement cycle begins, initiated by a sensor for example, whenever a sheet 10, with its leading edge in the conveying direction 18, has struck against a stop 72 which is secured to the last pusher 44 in the conveying direction. Two of the pushers 44 situated in front of the stop 72 each have a hook-shaped pusher dog 74.

At the beginning of each movement cycle, the pushers 44 are lowered so that they press the sheet 10, which has struck against the stop 72 and is held by the pusher dogs, down from the magnetic rollers and slide it laterally away from the guide 22 in the longitudinal direction of the magnetic rollers, that is to say transversely to the conveying direction 18. After half a revolution of the cam plate 68, the pushers 44 reach a position in which they push the sheet 10 moved by them into a withdrawal device 76 which is formed by a pair of rolls which can be driven in rotation in the example illustrated.

From there, each individual sheet 10 enters a flexer 78 which frees the sheet 10 of internal stresses by bending it backwards and forwards. Each sheet 10 is then rolled into a cylindrical body in a rounding station 80 and fed to a welding device 82 in the direction of the longitudinal axis of this cylindrical body. Flexer 78, rounding station 80 and welding device 82 are of known construction and need no explanation in the present connection.

We claim:

1. A conveying device for metal sheets (10), particularly on a can welding machine, comprising:
   a plurality of rotatable magnetic rollers having a gap between adjacent rollers for adhering to the sheets and sequentially conveying the sheets along a conveying direction, the sheets limited in movement along the conveying direction by a stop;
   a plurality of pushers positioned in a comb-like manner in said magnetic roller gaps, at least some of said pushers being movable from a retracted position where said magnetic rollers engage the conveyed sheets to an extended position where said pushers engage the conveyed sheets at a distance from said magnetic rollers, said pushers further for moving the conveyed sheets transversely to the conveying direction; and
   a withdrawal device disposed to a side of some of the magnetic rollers for receiving said transversely conveyed sheets.

2. A conveying device as claimed in claim 1 for metal sheets (10) which each comprise at least one raised portion (30) close to one lateral edge, characterised in that
   disposed at each side of the magnetic rollers (32) is a lateral guide (20, 22) and
   the magnetic rollers (32) leave a free space (38) between themselves and one of the lateral guides (20) for the raised portions (30) of the sheets (10).

3. A conveying device as claimed in claim 1 characterised in that at least one of the pushers (44) comprises a pusher dog (74) for the transverse conveying of the sheets (10).

4. A conveying device as claimed in claim 1, characterised in that the pushers (44) are mounted on parallelogram links (48).

5. A conveying device as claimed in claim 1, characterised in that the pushers (44) are of non-magnetic material.

6. A conveying device as claimed in claim 1, characterised in that said stop (72) is movable jointly with the pushers (44).

* * * * *